A. G. GULBRANSEN.
PEDAL MECHANISM FOR PNEUMATICALLY OPERATED PIANOS.
APPLICATION FILED NOV. 27, 1908.
972,182.
Patented Oct. 11, 1910.
2 SHEETS—SHEET 2.
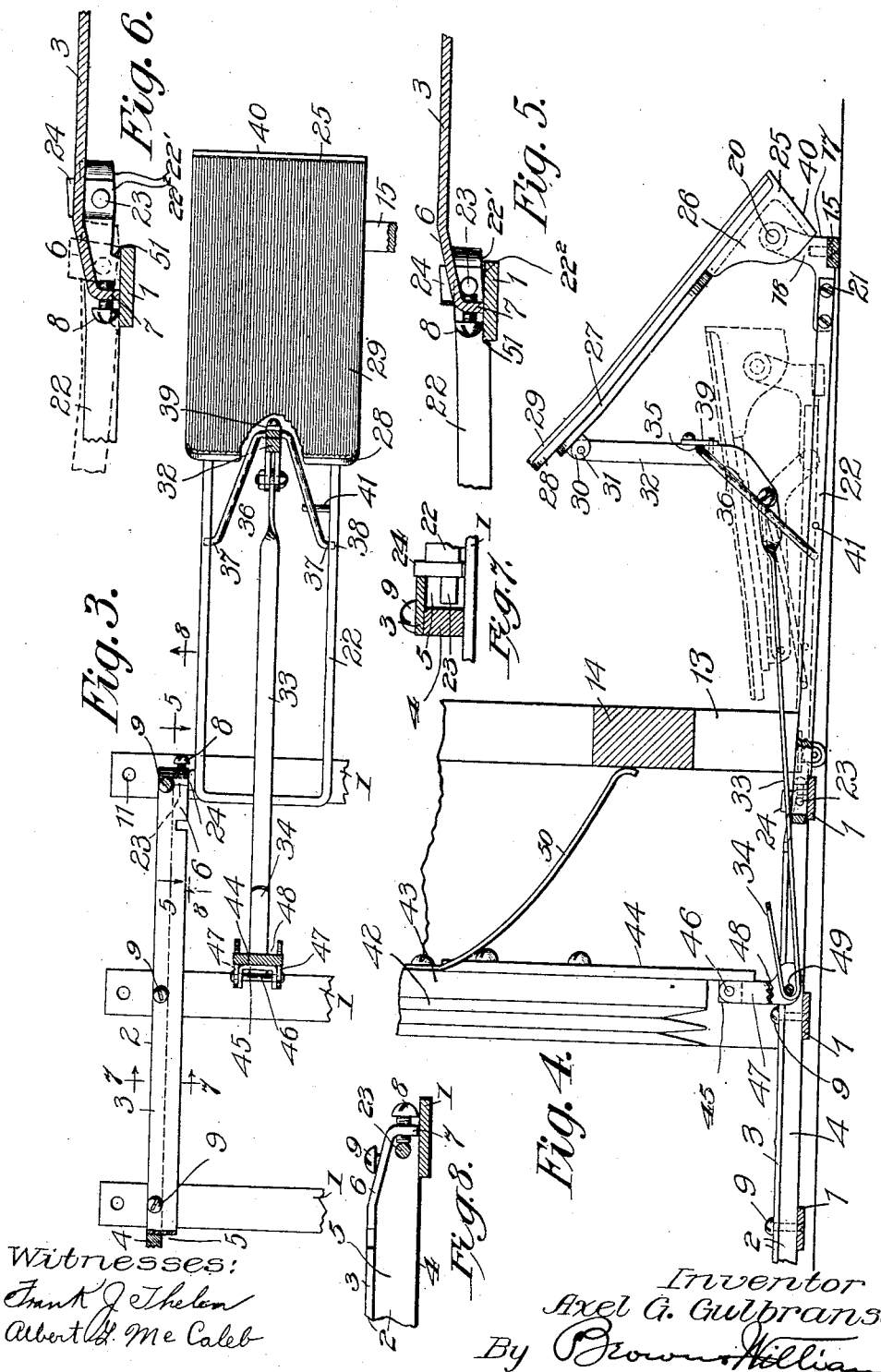
Witnesses:
Frank J. Thelen
Albert H. McCaleb
Inventor
Axel G. Gulbransen
By Brown Williams
Attorneys

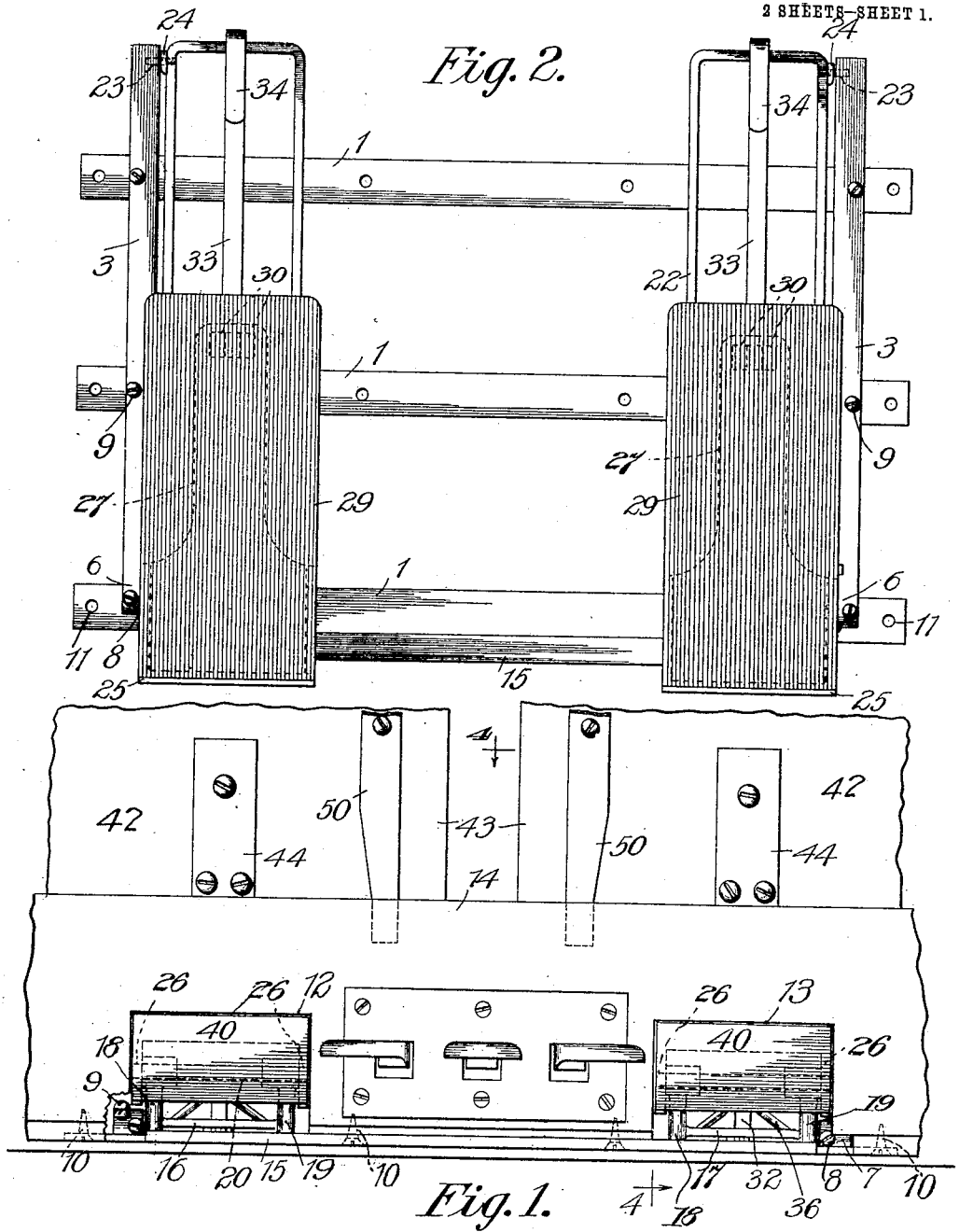

UNITED STATES PATENT OFFICE.

AXEL G. GULBRANSEN, OF CHICAGO, ILLINOIS, ASSIGNOR TO GULBRANSEN, DICKINSON COMPANY, OF CHICAGO, ILLINOIS, A CORPORATION OF ILLINOIS.

PEDAL MECHANISM FOR PNEUMATICALLY-OPERATED PIANOS.

972,182.  Specification of Letters Patent. Patented Oct. 11, 1910.

Application filed November 27, 1908. Serial No. 464,520.

*To all whom it may concern:*

Be it known that I, AXEL G. GULBRANSEN, a citizen of the United States, residing at Chicago, in the county of Cook and State of Illinois, have invented a certain new and useful Improvement in Pedal Mechanism for Pneumatically-Operated Pianos, (Case No. 9,) of which the following is a full, clear, concise, and exact description, reference being had to the accompanying drawings, forming a part of this specification.

My invention relates to pedal mechanism for pneumatically-operated pianos and may be considered as an improvement over the invention disclosed in my co-pending application, Serial No. 417,187, filed February 21, 1908.

In the co-pending application referred to, special complicated mechanism is shown for locking the pedal frame in its "out" position, a special controlling lever being necessary.

The main object of my present invention is to provide more simple and automatic means for locking the pedal mechanism in its "out" position.

Several features of improved mechanical arrangements are also involved in my invention, which will be understood when described by reference to the accompanying drawings, in which—

Figure 1 is a front view of the lower part of the piano casing showing the pedal mechanism in position within the piano casing, Fig. 2 is a top view of the pedal mechanism, Fig. 3 is a top view of half the pedal mechanism showing the pedal framework drawn out and the pedal raised, Fig. 4 is a sectional view taken on plane 4—4 of Fig. 1, the pedal mechanism being drawn out and the pedals raised, Fig. 5 is an enlarged sectional view taken on plane 5—5 of Fig. 3, Fig. 6 is a sectional view similar to Fig. 5, showing the position of the inner end of the pedal supporting frame just before reaching its final "out" position, Fig. 7 is an enlarged view taken on plane 7, 7 of Fig. 3, and Fig. 8 is an enlarged sectional view taken on plane 8, 8 of Fig. 3.

The supporting frame for the pedal mechanism comprises a plurality of cross-bars 1, preferably of metal, connected together at their ends by longitudinal guide members 2, each guide member being built up of the metallic bar 3 between the outer edge of which bar and the cross member 1 is inserted a bar or block 4, preferably of wood, this construction of the guide members affording guide grooves 5 best illustrated in Fig. 7.

As best shown in Figs. 5, 6 and 8, the front sections 6 of the bars slope downwardly, the ends 7 thereof being vertical and supporting adjustable abutment screws 8. The guide members can be secured to the cross members by screws 9 passing through the bars 3 and blocks 4, and threading into or being riveted into the cross members 1. This supporting frame is secured to the under side of the piano casing, as by means of screws 10 passing through the openings 11 in the cross members, the front cross member bridging the openings 12 and 13 cut in the lower edge of the front panel 14 of the piano casing, as best shown in Figs. 1 and 4.

The pedal supporting framework comprises a front cross bar 15, at whose ends are secured the left and right pedal pivot frames 16 and 17. Each pivot frame comprises the bearing uprights 18 and 19 through which passes a pivot shaft 20. Each pivot frame has secured to its sides by screws 21, the ends of a U shaped guide frame 22. At the bottom and outer side of each guide frame there is a guide pin 23 extending into the guide slot 5 of the corresponding guide member 3, a guide plate 24 being interposed between the pin and the guide frame for engaging the edge of the bar 3 of the corresponding guide member. The pedal supporting frame can, therefore, be very readily slid in and out, the pins 23 and plates 24 guiding said frame on the cross bars.

Each pedal comprises a metallic frame 25, whose side walls 26 receive the pivot shaft 20 of the corresponding pivot frame, the center part 27 of this frame extending to form a support for the pedal plate 28, which may be of wood and which has a layer 29 of rubber applied thereto. As shown in Figs. 2 and 4, from the end of each part 27 extend lugs 30 supporting a pin 31 to which is pivoted the outer end of a lever 32 whose lower end pivots to a connecting rod 33, which extends horizontally rearwardly through the corresponding opening 12 or 13 in the panel, and which terminates at its inner end in a hook 34. In the edge of the lever 32 at an intermediate point thereof is a slot 35 in which is pivoted a V shaped link 36 whose ends 37 are bent outwardly to bear in openings 38 cut in the inner face or edges of the corresponding guiding frame 22. A plate 39 secured to the lever 32 over the slide 35 holds the link 36 in place. With the above arrangement vertical reciprocation of the pedal will result in horizontal reciprocation of the connecting rod 33. When the pedal is up, as shown in Fig. 4, the lever 32 hangs vertically, the link 36 being raised, and the connecting rod 33 is in its innermost position. When the pedal is depressed to a horizontal position, the lever 32 and link 36 also assume a more or less horizontal position, and the rod 33 is in its outermost position. The pedals are indicated partly depressed by the dotted lines. The members when in this folded position readily pass through the openings 12 and 13 in the front panel of the piano casing, the ends 40 of the pedal frames 25 forming closures for said openings, as best shown in Fig. 1. Stop posts 41 extend from the guide frames 22 for receiving the links 36 when the walls 40 are in a vertical plane.

Within the piano casing, as best shown in Figs. 1 and 4 feeder bellows 42 are provided which are to be actuated by the pedal mechanism. To the movable member 43 of each bellows is secured a bar 44 which extends downwardly, and which near its lower end carries a U shaped pivot frame 45 for receiving a pivot shaft 46 connected with the side members 47 of a pivot link 48, the lower end of these side members being connected by a pivot pin 49 for engaging in the hook 34 of the connecting rod 33. Springs 50 engaging between the movable members 43 of the bellows and the front wall of the piano casing tend to keep the bellows in deflated position, and therefore when the pedal frames are drawn out from underneath the piano, the connecting rods 33 will be held in their "in" position by the force of these springs, and the pedals will move to their raised position. By depressing the pedals the connecting rods are drawn out and the movable members 43 of the bellows swung forwardly against the force of the springs 50, and the desired suction created. The pivot frames 45 being a distance from the ends of the extension bars 44, the forward rotation of the links 48 will be limited by the ends of the bars 44. The top ends of the side members 47 of the links are rounded, as best shown in Fig. 4, and the links can, therefore, rotate rearwardly from the bars 44. This hinge arrangement prevents binding when the pedal frames are to be moved into the piano casing.

When the pedal frames are to be moved to the inside of the piano casing from the distended position shown in Fig. 4, the cross-bar 15 is raised slightly and then pushed toward the piano. During this movement the hooks 34 will tend to move rearwardly away from the pivot pins 49 but as soon as the bars 33 are moved away from the pins 49, the pedals will fall and there will actually be no disconnection of the hooks from the pins 49 until the pedals have reached their lowermost position. After this, further movement of the bar 15 will cause the hooks 34 to move rearwardly to disconnect from the pins 49, the folded pedal parts entering through the openings 12, 13 and the end walls 40 finally closing said openings. During this operation of moving the pedals within the piano casing, the connecting rods 33 undergo more or less vertical movement and displacement or binding on this account will be prevented by the pivoted arrangement of links 48. After the hooks leave the pins 49, the links fall to their natural position, the pins being in position to be re-engaged by the hooks 34 when the pedals are again withdrawn by pulling out the bar 15, the pedals automatically moving to their distended position upon such outward movement.

In Figs. 5 and 6 is shown the improved arrangement for locking the pedal structures in their outer position. The under sides of the U-frames near the bottom are cut away to leave locking shoulders 51, the guide pins 23 extending from said frames at a point between the bottoms and said shoulders 51. In Fig. 6, the full lines show the U-frame in position just before the pin 23 reaches the slanting end section 6, and the dotted lines represent the position of the frame just as the shoulder 51 is about to leave the cross bar 1 and the U-frames drop down to their final operative position, this final position being illustrated in Fig. 5. The slanting sections 6 at the front ends of the guide bars 3 follow the pins 23 so as to engage the pins after the bottoms of the U-frames have dropped to their operative position, thus locking the inner ends of the U-frames against direct vertical disengagement of the shoulders 51 from the front edge of the front cross bar 1. It is only by swinging upwardly the front ends of the U-frames that the shoulders 51 will be released from the cross bar 1. Referring to Fig. 6, when the U-frames are pulled out, the pins 23 engage the slanting sections 6 before the shoulders 51 fall into locking engagement. This engagement of the slanting sections with the pins tends to resist upward swinging of the U-frames, and to force the shoulders 51 downwardly so that when said shoulders eventually clear the front edges of the front cross bar 1, the U-frames will be quickly forced downwardly into their locked operative position. As soon as shoulders 51 move into locking engagement, the pins 23 will abut against the abutment screws 8, as shown in Fig. 5, to lock the U-frames against further outward movement. In order that freer movement is possible, and that binding between the pins and the parts 6 is avoided, the under edges at the bottoms of the U-frames are cut away to leave the beveled surfaces 22'. When the pedal frames are now to be returned into the piano casing, the front bar 15 is raised sufficiently to carry the shoulders 51 above the front edges of the front cross bar 1, the U-frames then swinging about the edges formed by the beveled surfaces as shown in Fig. 5. The pins 23 engage the slanting parts 6 and tend to travel along the inclines and to draw the U-frames inwardly to carry the shoulders onto the front cross bar 1. The pedal frames having been thus unlocked, can be easily slid inwardly into the piano casing, the pedals and the various connecting levers and links folding up, as has been previously described.

As best shown in Fig. 4, the cross bar 15 extends a distance below the plane of the guide frames 22, the cross bar in its inner position then resting against the front edge of the front cross member 1. The pedal mechanism of my construction can, therefore, be easily and readily manipulated with one hand by merely pulling out or pushing in the cross bar 15. Upon pulling out of such bar, all the various parts automatically assume their operative positions, and are automatically locked in said operative positions, a slight raising of the cross bar before pushing it back to normal position automatically causing unlocking of the parts and restoration of said parts to their inoperative positions within the piano casing. The pedal mechanism is also very durable, the main parts being of metal.

Having thus described my invention, I desire to secure the following by Letters Patent:

1. In combination, a piano casing having a front wall provided with openings near its lower edge, cross bars extending lengthwise within the piano casing in the rear of said openings, a horizontal pedal frame, pedals pivoted to said frame, said pedal frame being adapted to slide horizontally through the openings and over the cross bars, said pedals being adapted to fold against the pedal frame to be carried into the piano casing with said frame, locking shoulders provided at the under side at the inner end of the pedal frame for engaging with the front edge of the front cross bar when the pedal frame is drawn out, whereby said pedal frame is locked in the out-position, and means tending to force said shoulders into locking engagement with the front cross bar.

2. In combination, a piano casing having a front wall provided with openings near its lower edge, cross bars extending lengthwise within the piano casing in the rear of said openings, a horizontal pedal frame, pedals pivoted to said frame, said pedal frame being adapted to slide horizontally through the openings and over the cross-bars, said pedals being adapted to fold against the pedal frame to be carried into the piano casing with said frame, locking shoulders provided at the under side at the inner end of the pedal frame for engaging with the front edge of the front cross bar when the pedal frame is drawn out, whereby said pedal frame is locked in the out-position, and means for retaining the inner end of the pedal frame against vertical displacement after locking engagement of the shoulders with the cross bar, swinging of the pedal frame about the inner end causing disengagement of the shoulders from the cross bar.

3. In combination, a piano casing having a front wall provided with openings near its lower edge, bars extending longitudinally within the piano casing to the rear of said openings, a pedal frame having extensions, pedals supported from the pedal frame and extensions, shoulders formed at the under side of the extensions near the inner ends thereof, said pedals being adapted to fold against the extensions, and said extensions and frame with the folded pedals being adapted to be slid over the cross bars and through the openings into the piano casing, the inner ends of the extensions dropping down when withdrawn from the piano casing to carry the shoulders thereon into locking engagement with the front edge of one of the cross bars, pins extending laterally from the inner ends of the extensions, and means for engaging said pins to retain the inner ends of the frames against direct vertical displacement, rotation of the extensions about their inner ends causing disengagement of the shoulders from the cross bar to allow said extensions and pedal frame to be slid through the openings into the casing.

4. In combination, a piano casing having a front wall provided with openings near its lower edge, guide bars extending lengthwise within the piano casing in the rear of said openings, guide ways associated with said bars, a pedal frame, extensions from said pedal frame, pedals connected with said pedal frame and extensions and adapted to be folded against said extensions, said pedal frame and extensions with the folded pedals being adapted to be slid over the guide bars and through the openings into the piano casing, pins extending laterally from the inner ends of the extensions and engaging in said guide ways to guide the pedal frame and extensions over the guide bars, and shoulders formed at the under side of the extensions near their inner ends, the pedal frame and extensions when withdrawn from the casing dropping down to carry the shoulders in locking engagement with the front edge of the front guide bar, a primary upward swing of the pedal frame and extensions about the rear ends of the extensions causing disengagement of said shoulders from the guide bar whereby the extensions, pedal frame and pedals may again be slid through the openings into the piano casing.

5. In combination, a piano casing having a front wall provided with openings near its lower edge, guide bars extending lengthwise within the piano casing in the rear of said openings, guide ways formed at the ends of said bars, a pedal frame, extensions from said pedal frame, pedals connected with said pedal frame and extensions and adapted to be folded against said extensions, said pedal frame and extensions with the folded pedals being adapted to be slid over the guide bars and through the openings into the piano casing, pins extending laterally from the inner ends of the extensions and engaging in said guide ways to guide the pedal frame and extensions over the guide bars, and shoulders formed at the under side of the extensions near their inner ends, the pedal frame and extensions when withdrawn from the casing dropping down to carry the shoulders in locking engagement with the front edge of the front guide bar, a primary upward swing of the pedal frame and extensions about the rear ends of the extensions causing disengagement of said shoulders from the guide bar whereby the extensions, pedal frame and pedals may again be slid through the openings into the piano casing, said pins being situated between the shoulders and the inner ends of the extensions and the front ends of the guideways slanting downwardly to engage the pins after dropping of the extensions into locking engagement, whereby the inner ends of said extensions are retained against direct vertical displacement.

6. In combination, a piano casing having a front wall provided with openings near its lower edge, guide bars extending lengthwise within the piano casing in the rear of said openings, guide ways associated with said bars, a pedal frame, extensions from said pedal frame, pedals connected with said pedal frame and extensions and adapted to be folded against said extensions, said pedal frame and extensions with the folded pedals being adapted to be slid over the guide bars and through the openings into the piano casing, pins extending laterally from the inner ends of the extensions and engaging in said guide ways to guide the pedal frame and extensions over the guide bars, shoulders formed at the under side of the extensions near their inner ends, the pedal frame and extensions when withdrawn from the casing dropping down to carry the shoulders in locking engagement with the front edge of the front guide bar, a primary upward swing of the pedal frame and extensions about the rear ends of the extensions causing disengagement of said shoulders from the guide bar whereby the extensions, pedal frame and pedals may again be slid through the openings into the piano casing, said pins being situated between the shoulders and the inner ends of the extensions and the front ends of the guideways slanting downwardly to engage the pins after dropping of the extensions into locking engagement, whereby the inner ends of said extensions are held against direct vertical displacement, the ends of the slanting sections being bent downwardly, and abutment screws passing through said end sections for receiving the pins after the shoulders have entered into locking engagement with the guide bar to thereby prevent further outward movement of the extensions.

7. In combination, a piano casing having a front wall provided with openings near its lower edge, guide bars extending lengthwise within the piano casing in the rear of said openings, a pedal frame having extensions, pedals connecting with said pedal frame and extensions and adapted to fold against said extensions, said extensions, frame and folded pedals being adapted to be slid over the guide bars through the openings and into the casing, shoulders formed at the under sides of the extensions near the inner ends thereof, said pedal frame and extensions dropping downwardly when withdrawn to their operative position so that the shoulders are carried into locking engagement with the front edge of the front guide bar whereby said pedal mechanism is locked against reinsertion into the piano casing except by first swinging the extensions about their inner ends to clear the shoulders from the guide bar, pins extending laterally from the extensions, and abutments to be engaged by said pins when the shoulders enter into locking engagement with the guide bar.

8. In combination, a piano casing having a front wall provided with openings near its lower edge, a guide bar extending lengthwise within the casing in the rear of the openings, a pedal frame, horizontal extensions from said pedal frame, pedals connected with said pedal frame and extensions and adapted to be folded against said extensions, feeder bellows within the casing, horizontal connecting rods extending through said openings and connected with said pedals and the movable member of said feeder bellows for transmitting the movements of said pedals to the feeder bellows, said pedal frame, extensions, folded pedals and connecting rods being adapted to be slid together through said openings into the casing, and shoulders formed at the lower sides of the extensions near the inner ends thereof, the extensions dropping down when withdrawn from the casing, so that the shoulders drop into engagement with the front edge of the guide bar, a slight upward tilt of the extensions causing disconnection of said shoulders from the guide bar, whereupon the various parts may be again slid through the opening into the casing.

In witness whereof, I hereunto subscribe my name, this 17th day of November, 1908.

AXEL G. GULBRANSEN.

Witnesses:
CHARLES J. SCHMIDT,
FRANK J. THELEN.